United States Patent [19]
Guillemin

[11] Patent Number: 5,109,755
[45] Date of Patent: May 5, 1992

[54] HEATING AND VENTILATING APPARATUS FOR THE CABIN OF AN AUTOMOTIVE VEHICLE

[75] Inventor: Jean Guillemin, Elancourt-Maurepas, France

[73] Assignee: Valeo, Paris, France

[21] Appl. No.: 555,616

[22] Filed: Jul. 23, 1990

[30] Foreign Application Priority Data

Jul. 28, 1989 [FR] France .................. 89 10252

[51] Int. Cl.⁵ .............................. B60H 1/03
[52] U.S. Cl. ..................... 454/160; 237/12.3 A; 454/126
[58] Field of Search ............... 98/2.08, 2.09; 237/12.3 A, 12.3 B

[56] References Cited

U.S. PATENT DOCUMENTS 4,440,212  4/1984  Tanino et al. .............. 98/2.08
4,545,526  10/1985  Ido et al. .
4,940,083  7/1990  Takenaka et al. ............ 98/2.08

FOREIGN PATENT DOCUMENTS 3608524  9/1987  Fed. Rep. of Germany .
2562845  10/1985  France .

Primary Examiner—Henry A. Bennett
Attorney, Agent, or Firm—Dennison, Meserole, Pollack & Scheiner

[57] ABSTRACT

A heating and ventilating apparatus for the cabin or passenger compartment of an automotive vehicle includes a cold air transmission branch and an air heating branch, communicating with each other through a mixing zone and leading respectively to a de-icing port for the windshield of the vehicle, aerators or cabin vents at the level of the fascia panel, and lower outlet ports in the lower part of the cabin. A direct guide duct is arranged with its inlet penetrating partly into the outlet of the air heating branch, and with its outlet opening in the vicinity of the de-icing port, which allows warm air coming from the air heating branch to be mixed with the pre-mixed air coming from the mixing zone.

5 Claims, 3 Drawing Sheets

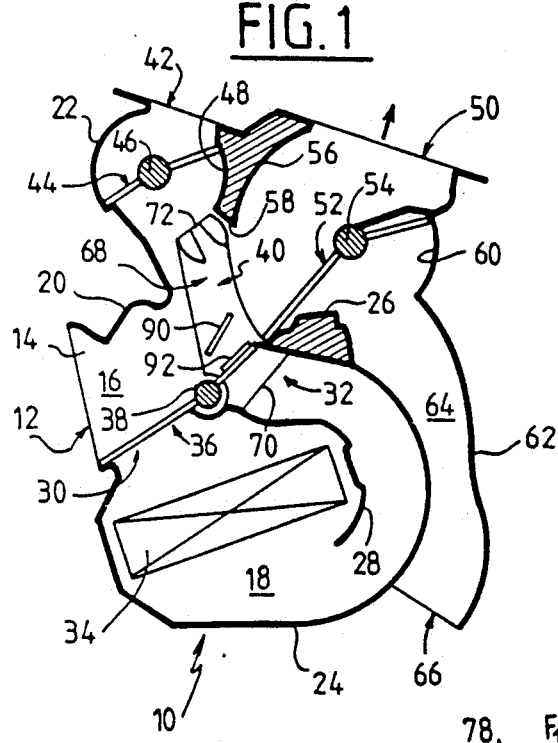
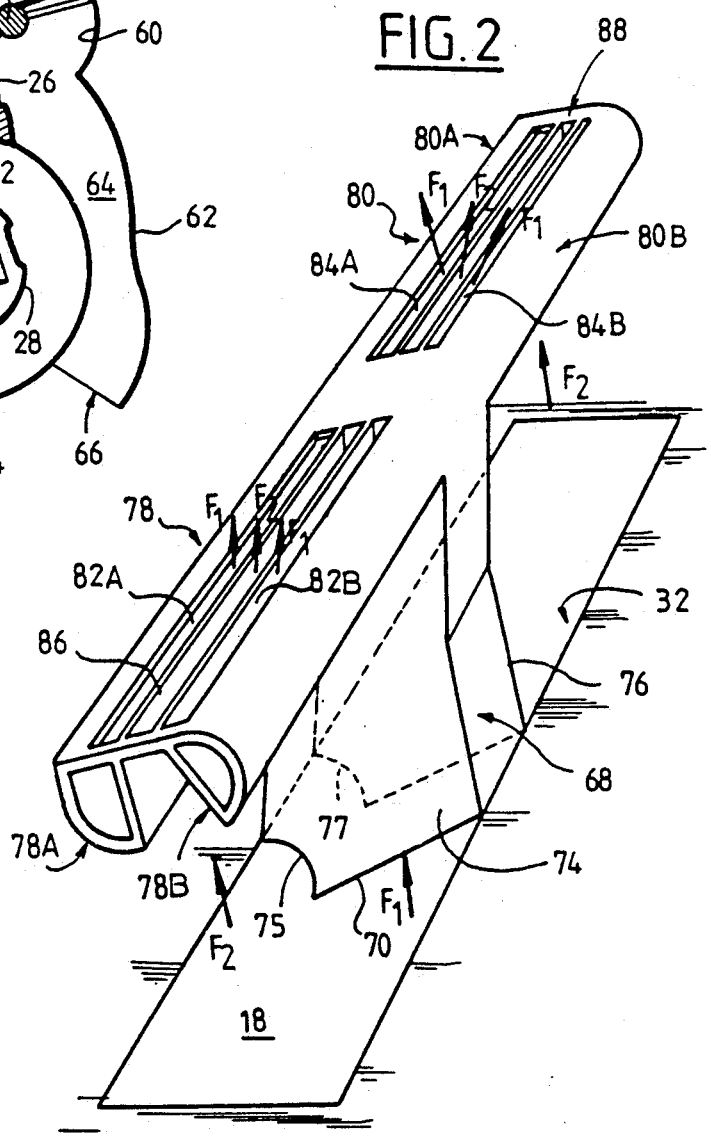
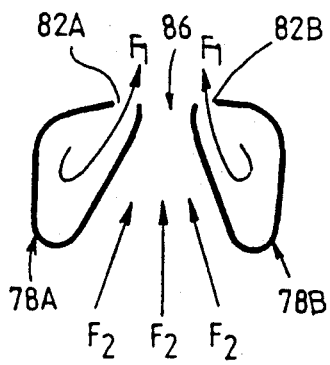

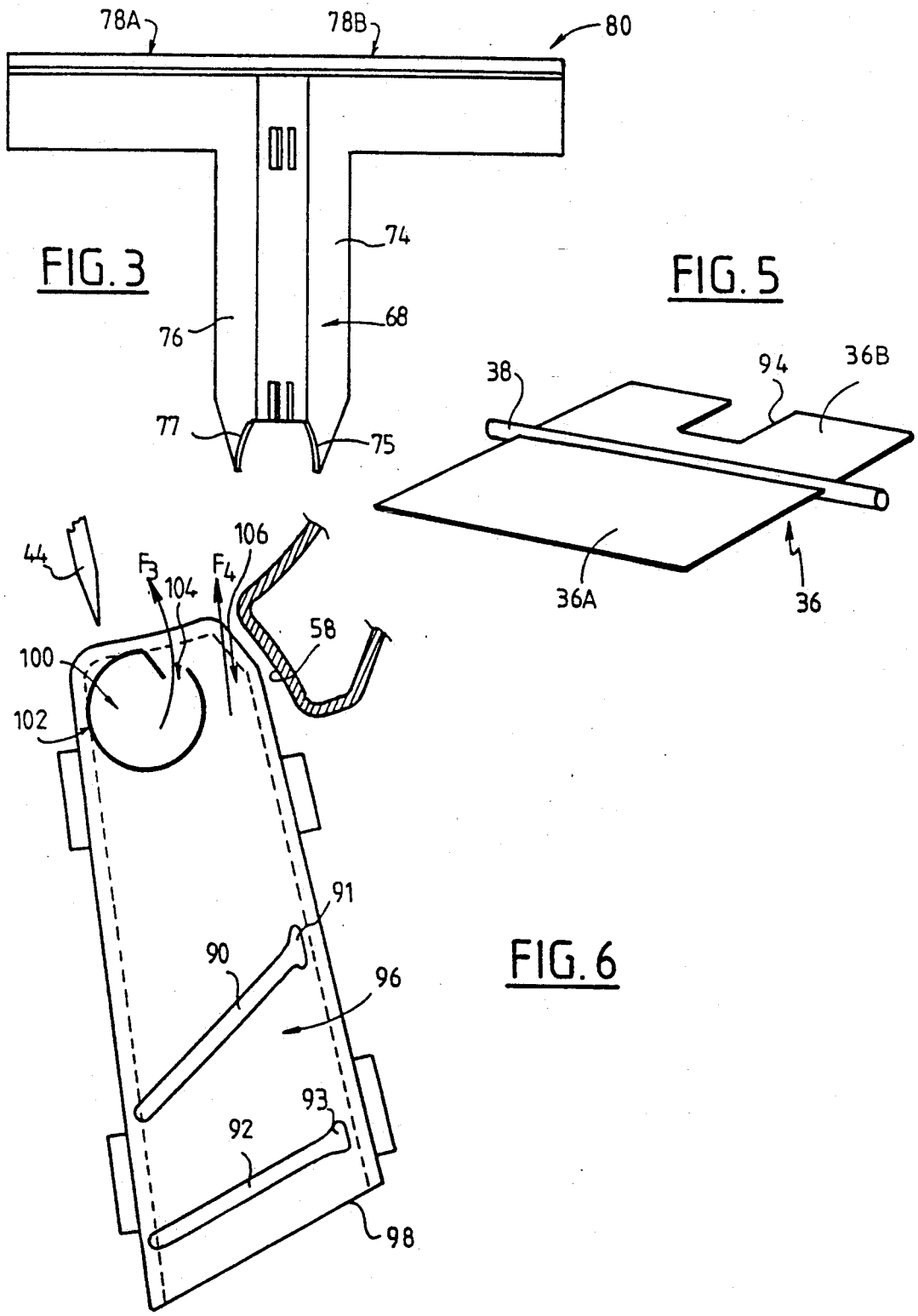

HEATING AND VENTILATING APPARATUS FOR THE CABIN OF AN AUTOMOTIVE VEHICLE

FIELD OF THE INVENTION

This invention relates to a heating and ventilating apparatus for the cabin or passenger compartment of an automotive vehicle.

The apparatus of the invention is of the general type comprising: a cold air inlet duct; a cold air transmission branch which is supplied through the cold air inlet duct; an air heating branch which is supplied through the cold air inlet duct and which contains a heat exchanger, with the two said branches communicating with each other through a mixing zone which supplies selectively a de-icing port for the windshield, main air or cabin vents (referred to herein as aerators) at the level of the fascia panel, and lower outlet ports in a lower part of the cabin, a mixing flap valve being disposed at the junction of the inlet duct and the two said branches for causing the distribution of the air flow coming through the inlet duct to be varied as between the said two branches, with consequent variation in the temperature of the air in the mixing zone. Such an apparatus will be referred to herein as an apparatus of the kind specified.

BACKGROUND OF THE INVENTION

In known apparatuses of the above type, the cold air coming from outside the cabin of the vehicle, or perhaps from an air conditioning unit, is distributed between the cold air transmission branch and the air heating branch, which allows the temperature of the air which is received in the mixing zone, and which is then passed towards the outlet ports, that is to say the de-icing port, the aerators or cabin vents and the lower outlet ports which open into the lower part of the cabin, to be regulated.

The de-icing port, which is located close to the windshield, is adapted to be supplied essentially with warm air so as to cause the windshield to be freed of ice, or to be de-misted. The cabin vents or aerators, which are located at the level of the fascia panel, and thus at a lower level than the de-icing port, are arranged to be supplied preferentially with external cold air so that the occupants of the vehicle will receive cooler air around their faces. Finally, the ports situated in the lower part of the vehicle cabin, and therefore at a level lower than that of the aerators, are adapted to be supplied preferentially with warm air so as to provide heating around the feet of the occupants.

The distribution of the air flow between the various outlet vents or ports mentioned above is generally controlled by means of a first flap valve which controls the de-icing port and a second flap vale which controls at the same time both the aerators and the lower outlet ports.

In the known arrangements of the above type, the mixing zone is designed in such a way that the mixture of the cold air coming from the cold air transmission branch with warm air coming from the air heating branch is not complete, so that downstream of the mixing zone two air flows having different temperatures are obtained, these flows being led respectively to the various outlet ports. In this way a certain configuration of air distribution can be obtained which allows temperature to be stratified in the manner known as "bi-level". Under these conditions, the air stream at the higher temperature is led towards the ports located in the lower part of the vehicle cabin, while the air stream of lower temperature is led towards the upper part of the cabin, that is to say towards the de-icing port and/or the aerators.

Although this known solution achieves the objective of distributing cooler air through the aerators, it unfortunately also has the disadvantage of not facilitating de-icing or de-misting of the windshield, because the warm air which is delivered to the de-icing port is at a lower temperature than that which is led towards the feet of the occupants.

In the known arrangements, and for reasons connected with the mounting of the apparatus under the fascia panel of the vehicle, the cold air transmission branch extends generally horizontally, while the air heating branch is generally situated below the cold air transmission branch. Conventionally, the air heating branch is of a U-shaped configuration, with its outlet so directed as to deliver a flow of warm air upwardly.

It is thus desirable to be able to control the flow of cold air which is generally horizontal and the flow of warm air which is generally vertical, and which must be passed upwardly towards the de-icing port and/or be diverted downwardly towards the outlet ports in the lower part of the vehicle cabin, all to a greater or lesser degree according to the different distribution positions that may be selected.

Thus, in the position in which the aerators and the lower outlet ports are open at the same time (i.e. in the position known as the "aeration/foot" position), it is necessary to be able to deliver a stream of cold air towards the aerators and a stream of warm air towards the feet of the occupants, with a temperature difference of the order of 15 degrees C. between these two streams. By contrast, in the position in which the de-icing port and the lower outlet ports are open (which may be called "de-icing/foot" position), the warm air must be delivered at the same time and at the same temperature towards both the windscreen and the feet of the occupants.

The problem to be resolved is thus to control the flows of cold air and warm air coming respectively from the cold air transmission branch and from the air heating branch, in such a way as to allow the temperature difference between the two flows to be maximised in the aeration/foot position, but with no temperature difference in the de-icing/foot position.

In order to overcome this problem, it has already been proposed in Patent Specification No. 3 608 524 of the Federal Republic of Germany to provide a cold air duct extending directly from the cold air inlet to the aerators, which then allows a supplementary cold air stream to be delivered, if desired, to the aerators. Again, in the specification of French published patent application No. FR 2 562 845A, it has been proposed to provide, in the sides of the housing of the apparatus, and facing the outlet of the air heating branch, two deformations on the sides of the housing. This allows two quasi-ducts or flow paths to be created which direct warm air onto the sides, with the cold air passing directly through the middle and being controlled by a heater flap valve. This solution is not satisfactory, because it allows warm air to escape all the time through the two deformations mentioned above, so that a homogeneous mixture of the warm air with the cold air is not achieved.

DISCUSSION OF THE INVENTION

A principal object of the invention is to overcome the disadvantages mentioned above. To this end, the invention proposes a heating and ventilating apparatus of the kind specified, in which, in accordance with an essential feature of the invention, there is provided a guide duct having an inlet partly covering the outlet of the air heating branch and an outlet opening close to the de-icing port, so that warm air from the air heating branch is mixed in the guide duct with the air mixture from the mixing zone, the guide duct being provided at its outlet with at least one distributor adapted to facilitate the distribution of the warm air coming from the air heating branch and the mixture of this warm air with the already mixed air coming from the mixing zone.

Thus, in accordance with the invention, the air distributed through the de-icing port is at a higher temperature than the mixed air which would normally be delivered to the de-icing duct if the guide duct were not present.

If it is desired to deliver cold air to the aerators, this air can easily bypass the guide duct and pass direct to the aerators. On the other hand, if it is desired to deliver warm air to the de-icing port, warm air can be bled from the air heating branch and guided towards the de-icing port, this warm air being mixed with the premixed air coming from the mixing zone.

In one preferred embodiment of the invention, the apparatus includes two of the said distributors, these being disposed on either side of the guide duct so as to define with it a generally T-shaped configuration.

In a first embodiment of the invention, each distributor comprises two tubes which are disposed close to each other, and each of which defines a longitudinal slot for warm air distribution, the two tubes defining between them a further slot for flow of mixed air.

In a further embodiment, each distributor comprises a tube having a longitudinal slot for the distribution of warm air, the tube being disposed close to an inner wall portion of the apparatus so as to define with the latter a further slot for the passage of mixed air.

Finally the invention in a preferred form provides that the apparatus includes at least one vane arranged on each side of the guide duct, so as to prevent mixing of cold air with warm air. Preferably, each such vane is disposed parallel to each distributor and is of substantially the same length as the latter.

The description of preferred embodiments presented below is given by way of example only and with reference to the accompanying drawings.

BRIEF DESCRIPTION OF THE DRAWINGS

FIG. 1 is a view in transverse cross section of an apparatus according to the invention.

FIG. 2 is a perspective view of a guide duct unit for the apparatus shown in FIG. 1.

FIG. 3 is a front view of the guide duct unit seen in FIG. 2.

FIG. 4 is a diagrammatic view, in transverse cross section, of a distributor in the guide duct unit shown in FIG. 2.

FIG. 5 is a perspective view of the mixing valve for the apparatus shown in FIG. 1.

FIG. 6 is a side view of a guide duct suitable for the apparatus shown in FIG. 1, in another embodiment of the invention.

DESCRIPTION OF PREFERRED EMBODIMENTS OF THE INVENTION

Figure 7:
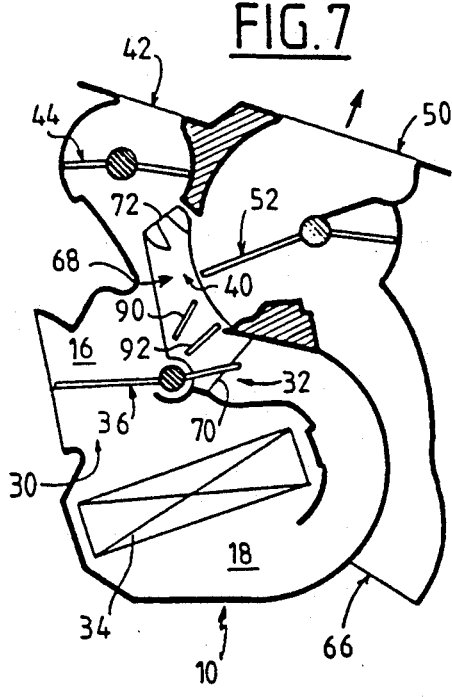
FIGS. 7 to 10 show the apparatus of FIG. 1, but with various different distribution patterns.

The apparatus shown in FIG. 1 is for the heating and ventilation of the cabin or passenger compartment of an automotive vehicle. It includes a housing 10, bounded by walls having parallel generatrices and extending perpendicular to the plane of the drawing, together with walls which extend parallel to the plane of the drawing.

The housing 10 includes an inlet port 12 which is connected to a cold air inlet duct 14. The port 12 is arranged to be connected to the outlet of a ventilating fan unit (not shown), which is adapted to deliver into the cold air inlet duct 14 cold air from outside the cabin of the vehicle or, optionally, from an air conditioning unit. The inlet duct 14 exhausts firstly into a cold air transmission branch 16 and secondly into an air heating branch 18. The cold air transmission branch 16 is bounded on the outside by a wall 20 which leads from the inlet port 12 and which is joined to a cylindrical wall portion 22.

The air heating branch 18 has a U-shaped configuration, being bounded by a wall 24 which is curved inwardly as shown and which leads from the inlet port 12, to terminate at its other end in an outwardly directed abutment 26. A partition 28 is disposed within the pocket thus formed, so as to define a U-shaped circulation path in the latter. The cold air transmission branch 16 extends in a direct manner across the two extremities of this U, and the branch 18 communicates with the branch 16 through an inlet 30 and also through an outlet 32. A heat exchanger 34, which is arranged inside the branch 18, is arranged to heat air circulating within the branch 18. This heat exchanger is for example supplied permanently with cooling fluid from the engine of the vehicle.

The apparatus also includes a mixing valve in the form of a flap valve 36, which is mounted for rotation about an axis defined by a spindle 38. The mixing valve 36 is arranged at the junction between the cold air inlet duct 14 and the branches 16 and 18, so as to enable the distribution, between these two branches, of the air supply received via the cold air inlet duct, to be varied. This variation causes the temperature of the air leaving the branches 16 and 18 also to be varied. The branch 18 communicates with the branch 16 at its outlet 32 through a mixing zone 40, in which the cold air leaving the branch 16 and warm air coming from the branch 18 can be mixed for delivery to various outlet ports 42, 50 and 66.

One of these ports is a de-icing and de-misting port (referred to as a de-icing port) 42, which is controlled by a first flap valve 44. This valve is pivotally mounted about an axis defined by a spindle 46 and cooperates frictionally with the inner face of the wall portion 22 and the inner face of a cylindrical wall portion 48.

The outlet ports 50 consist of aerators 50, which are arranged at the level of the fascia panel, with each aerator being controlled by a second flap valve 52 which is mounted rotatably about an axis defined by a spindle 54, parallel to the axis 46. One of the ends of the flap valve 52 is arranged to cooperate sealingly with the inner face of an inwardly curved wall portion 56, which is joined to the wall portion 48 through a short wall portion 58. This same end of the flap valve 52 is arranged to come into engagement on the abutment 26 in the position shown in FIG. 1. The other end of the flap valve 52 is arranged to cooperate sealingly with a cylindrical wall portion 60, which is joined to a further wall portion 62 so as to form with the outside of the wall 24, a duct 64 which feeds lower outlet ports 66 in the lower part of the vehicle cabin. It will be understood that the flap valve 52 also allows distribution of the air towards the ports 66 to be controlled.

A guide duct 68 is also provided. The inlet 70 of this guide duct penetrates into the outlet 32 of the air heating branch 18, so as partly to cover the latter, i.e. it extends over part of the cross-sectional area of the outlet 32 as seen in FIG. 2. The outlet 72 of the guide duct 68 is open in the vicinity of the de-icing port 42; this allows warm air coming from the air heating branch 18 to be mixed with the already mixed air coming from the mixing zone 40.

As can be seen from FIG. 2, the outlet 32 of the air heating branch 18 is oblong in shape, and in this example it is rectangular, while the inlet 70 of the guide duct 68 is arranged at the centre of the outlet 32. The inlet 70 is generally rectangular in cross section, its cross section being wider than that of the outlet 32 but shorter in length. By way of example, the ratio between the length of the inlet 70 and the length of the outlet 32 may lie between one tenth and one fifth. As a result, only some of the warm air from the heating branch 18 will be distributed via the guide duct 68 to the de-icing port 42.

The guide duct 68 has two parallel flanks 74 and 76, which are generally perpendicular to the cross-sectional plane of the outlet 32, and which have notches 75 and 77 respectively to accommodate the spindle 38 of the mixing flap valve 36. The guide duct 68 forms a unit with two distributors, 78 and 80 respectively, which spring from the flanks 74 and 76. These distributors are for facilitating the distribution of the warm air coming from the branch 18, and for facilitating the mixing of this warm air with the already mixed air coming from the mixing zone 40 and flowing outside the guide duct 68, that is to say along the outside of the flanks 74 and 76.

The distributors 78 and 80, together with the guide duct 68, present a general configuration in the form of a T. The distributors 78 and 80, which are arranged in line with each other, thus extend parallel to the length of the de-icing port 42, the latter also having a generally rectangular shape.

The distributor 78 comprises two tubes 78A and 78B which are arranged close to each other, and each of which has a respective longitudinal slot 82A, 82B for warm air distribution. In a similar way, the distributor 80 comprises two tubes 80A and 80B, arranged close to each other, with each of these tubes having a longitudinal distribution slot 84A, 84B respectively. The slots 82A, 82B, 84A and 84B serve for the distribution of warm air as indicated by the arrows F1. A further longitudinal slot 86 is arranged between the two tubes 78A and 78B, while a longitudinal slot 88 is similarly arranged between the tubes 80A and 80B. The slots 86 and 88 serve for the passage of the mixed air coming from the mixing zone as indicated by the arrows F2. This mixed air is thus further mixed, in particular under the influence of turbulence, with the warm air; and this produces a final air mixture of particularly good homogeneity. Air is thus obtained the temperature of which is higher than that of the mixed air which would normally be delivered to the de-icing port, direct from the mixing zone, if the guide duct 68 were not present (see FIG. 4).

As can be seen from FIG. 1, two vanes or ailerons 90 and 92 are mounted on the outside of each of the flanks 74 and 76 of the guide duct 68, i.e. on either side of the latter. The vanes 90 and 92 are shown only in FIGS. 1 and 6 to 10. These vanes, which extend parallel to the distributors 78 and 80 and over substantially the same length as the latter, are designed to facilitate and to guide the stream of cold air or warm air flowing outside the guide duct 68.

Reference is now made to FIG. 5, which shows diagrammatically the structure of the mixing flap valve 36. This flap valve comprises two generally rectangular members 36A and 36B which are arranged on either side of the spindle 38. The member 36A is arranged to obturate the inlet 30 of the branch 18 to a greater or lesser extent, while the member 36B is adapted to obturate the outlet 32 of the branch 18 to a greater or lesser extent. The member 36B includes a notch 94, generally rectangular in shape, to accommodate the guide duct 68.

Reference is now made to FIG. 6, which shows a guide duct 96 in a modified embodiment. This guide duct includes an inlet 98 which is arranged to be adapted to the outlet 32 of the air heating branch 18, together with an outlet 100 which exhausts into two distributors 102 (only one of which is seen in FIG. 6). These two distributors are arranged on either side of the guide duct 96 so as to define with it a unit having a general configuration in the form of a T. Each distributor 102 is in the form of a tube which has a longitudinal slot 104, through which warm air coming from the branch 18 passes as indicated by the arrows F3. This warm air is subsequently mixed with the mixed air from the zone 40 (FIG. 1) passing through a further slot 106 which is defined between the distributor 102 and the inner wall portion 58 of the housing. This mixed air flows as indicated by the arrows F4. Here again, good homogeneity of the final mixture of warm air and mixed air is obtained.

In the embodiment shown in FIG. 6, the guide duct 96 is again provided with two vanes or ailerons 90 and 92 on either side, these vanes being similar to those described above. They have respective ends 91 and 93 which are arranged effectively to form extensions of the flap valve 52 in certain positions of the latter, so as to provide continuity.

Reference is now made to FIG. 1 together with FIGS. 7 to 10, in order to describe the operation of the apparatus in different distribution patterns.

In the position shown in FIG. 1, which may be referred to as the "aeration position", the mixing flap valve 36 is in a closed position of the branch 18, and only cold air is supplied to the mixing zone 40. In this position, the flap valve 44 closes off the de-icing port 42, while the flap valve 52 is in engagement on the abutment 26, in such a way as to allow cold air to pass only towards the aerators 50. In this position, the guide duct 68 serves no purpose. The vanes 90 and 92 are parallel to the flow of cold air, and cause no significant energy losses to occur.

In the position shown in FIG. 7, which is the "aeration/foot" or "bi-level" position referred to above (with stratification of temperature), the mixing flap valve 36 is in an intermediate position, which allows air to be distributed at two temperature levels in the mixing zone 40. The flap valve 44 controlling the de-icing port 42 is still closed, while the flap valve 52 is in an intermediate position, which allows an airflow to be obtained simultaneously towards the aerators 50 and towards the lower outlet port 66. However, in this position a stratification of the temperature is obtained, with the warmer air being delivered towards the lower outlet ports 66 and therefore towards the feet of the occupants of the vehicle, while the cold or slightly warmed air is delivered towards the aerators 50. Between these two air streams a temperature difference of the order of 15 degrees C. is obtained. It should be noticed that the vanes 90 and 92 contribute to the guidance of the cold air towards the aerators 50 and of the warm air towards the ports 66, by hindering mixing of the warm air with the cold air.

Figure 8:
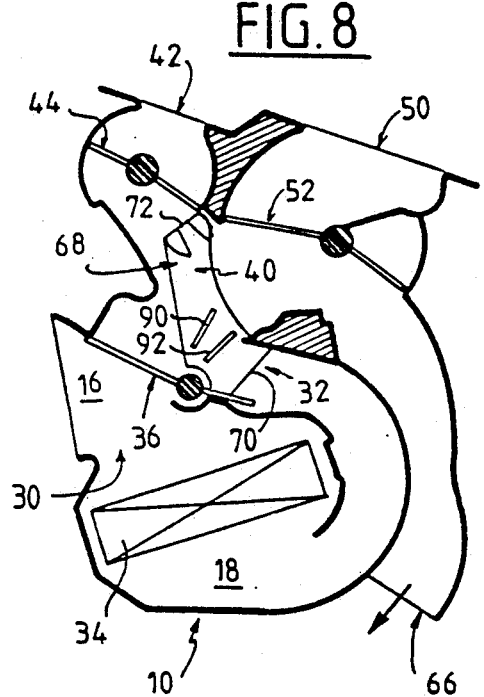

In the position shown in FIG. 8, which may be referred to as the "foot only position", the flap valve 44 controlling the de-icing port 42 is still closed, while the flap valve 52 is in such a position that it closes off the aerators 50 while allowing air to be delivered towards the lower outlet ports 66. In FIG. 8, the mixing valve 36 is shown in a position in which all of the air coming from the inlet duct 14 passes via the air heating branch 18, and is thus heated by the heat exchanger 34. In practice, however, the mixing valve 36 may assume any intermediate position, as a function of the temperature required at the level of the lower part of the vehicle cabin. In this FIG. 8 position, the vanes 90 and 92 facilitate the guidance of warm air towards the outlet ducts 66.

Figure 9:
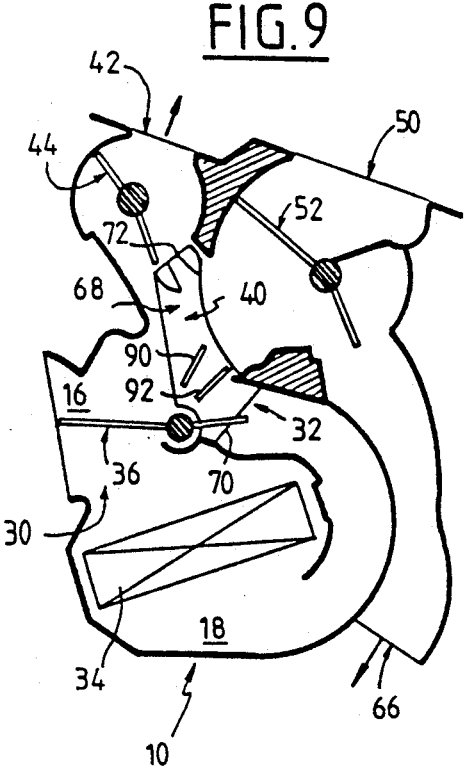

FIG. 9 shows the position which is referred to above as the "de-icing/foot position". In this position, the mixing flap valve 36 is generally in an intermediate position. The flap valve 44 is also in an intermediate position, in which it partly opens the passage delimited between the wall portions 20 and 58 and leading towards the de-icing port 42. The position of the flap valve 52 is such that the air coming from the mixing zone 40 can only be delivered towards the lower outlet ports 66.

Having regard to the effect of temperature stratification which is obtained in the mixing zone 40, warm air would normally be delivered to the outlet ports 66 at a higher temperature than the warm air at the de-icing port 42. Due to the presence of the guide duct 68, however, part of the warm air flow is taken to the outlet of the branch 18 so as to be directed towards the de-icing port 42. This warm air is thus mixed with the mixed air coming from the mixing zone 40, with this mixed air then flowing on the outside of the guide duct 68. Because of this, a temperature difference is obtained that is for all practical purposes zero, as between the warm air delivered towards the de-icing port 42 and the warm air delivered towards the lower outlet ports 66. Here again, the vanes 90 and 92 facilitate distribution of the flow of mixed air towards the ports 66.

Figure 10:
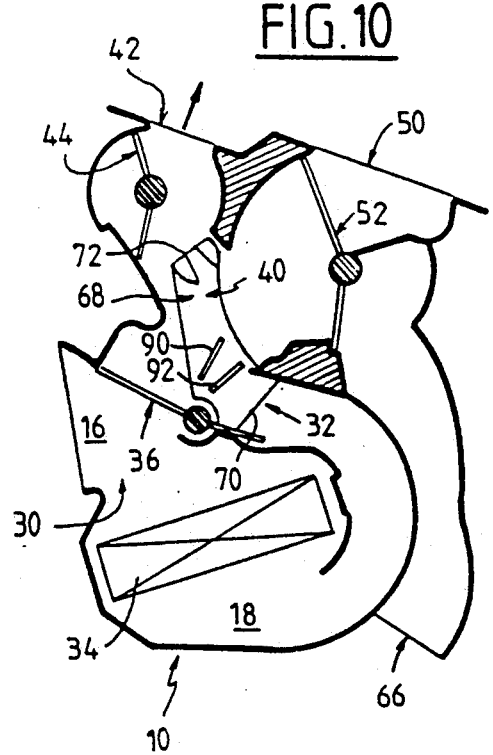

FIG. 10 shows a position which may be referred to as the "de-icing only" position. In this position, the mixing flap valve 36 is open to its maximum extent, so as to allow all the air to pass through the branch 18. Also in this position, the flap valve 44 controlling the de-icing port 42 is fully open, while the flap valve 52 is shut so as to close off access to the aerators 50 and to the lower outlet ports 66. In this position, all of the warm air is delivered towards the de-icing port, with a part of this air passing within the guide duct 68 and another part passing on the outside of the latter.

What is claimed is:

1. Heating and ventilating apparatus for the cabin of an automotive vehicle, comprising: a housing having a cold air inlet duct, a cold air transmission branch leading from the said inlet duct, an air heating branch leading from the said inlet duct and having an outlet, a mixing zone at the junction of the said branches, outlet port means comprising de-icing port means, aerator means and lower outlet port means, the housing defining means whereby each of the said outlet port means can communicate with the mixing zone; valve means in the housing for selectively directing air from the mixing zone to the various said outlet port means; a mixing valve at the junction of the said branches and the said inlet duct, for varying distribution of air from the inlet duct as between the said branches whereby to vary air temperature in the mixing zone; a heat exchanger in the air heating branch; a guide duct having an inlet partly covering the outlet of the air heating branch and an outlet opening close to the de-icing port means; and at least one air distributor leading from and on each side of the outlet of the guide duct to define a generally T-shaped configuration therewith, whereby warm air heated by the heat exchanger can be distributed and homogeneously mixed with air already mixed in the mixing zone.

2. Apparatus according to claim 1, wherein each distributor comprises two tubes which are disposed close to each other, and each of which defines a longitudinal slot for warm air distribution, the two tubes defining between them a further slot for flow of mixed air.

3. Apparatus according to claim 1, wherein each distributor comprises a tube having a longitudinal slot (104) for the distribution of warm air, the tube being disposed close to an inner wall portion of the apparatus so as to define with the latter a further slot for the passage of mixed air from the mixing zone.

4. Apparatus according to claim 1, further comprising at least one vane disposed externally on either side of the guide duct.

5. Apparatus according to claim 4, wherein each said vane is disposed parallel to a said distributor and is of substantially the same length as the latter.

* * * * *